UNITED STATES PATENT OFFICE.

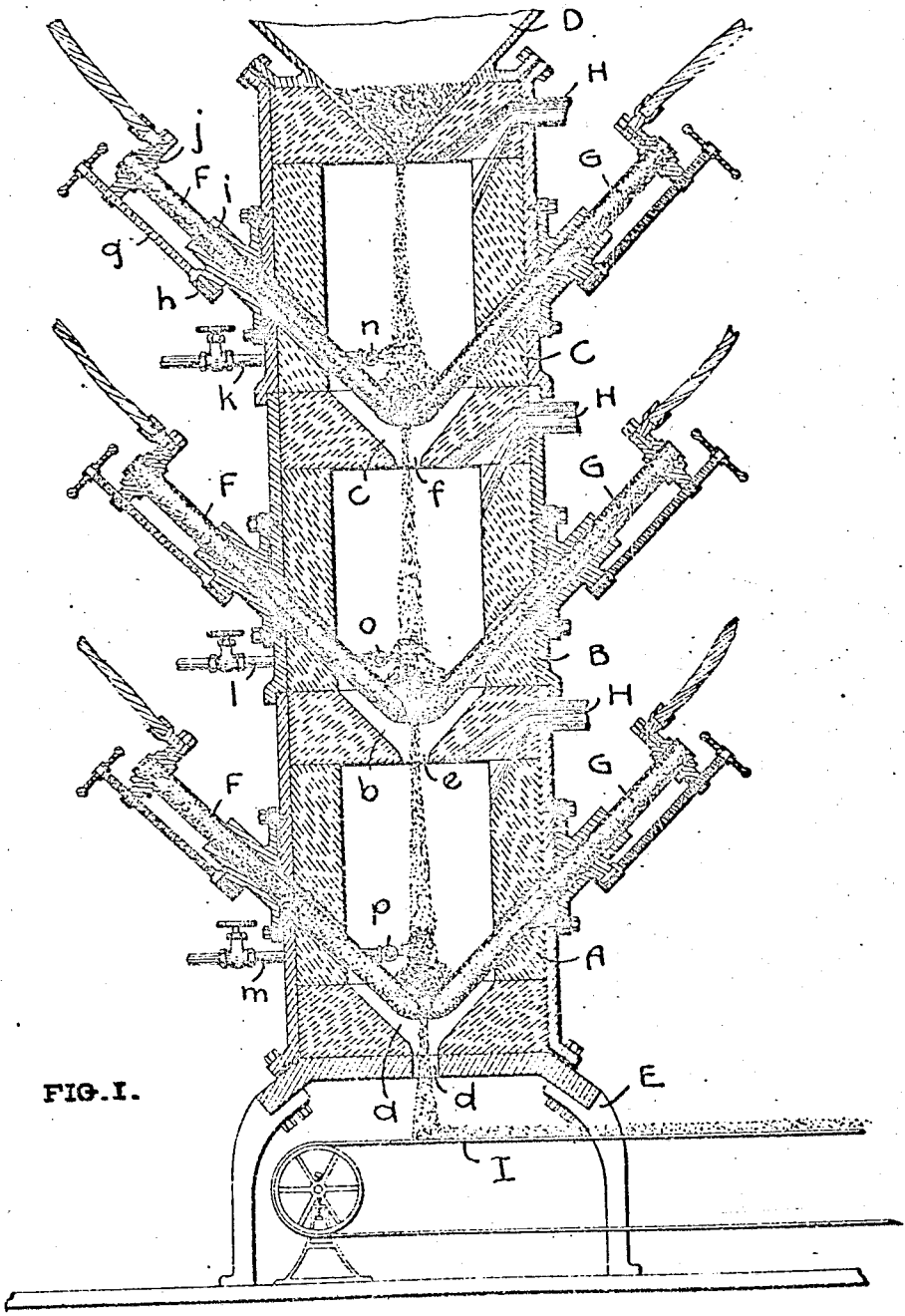
FIG. I.

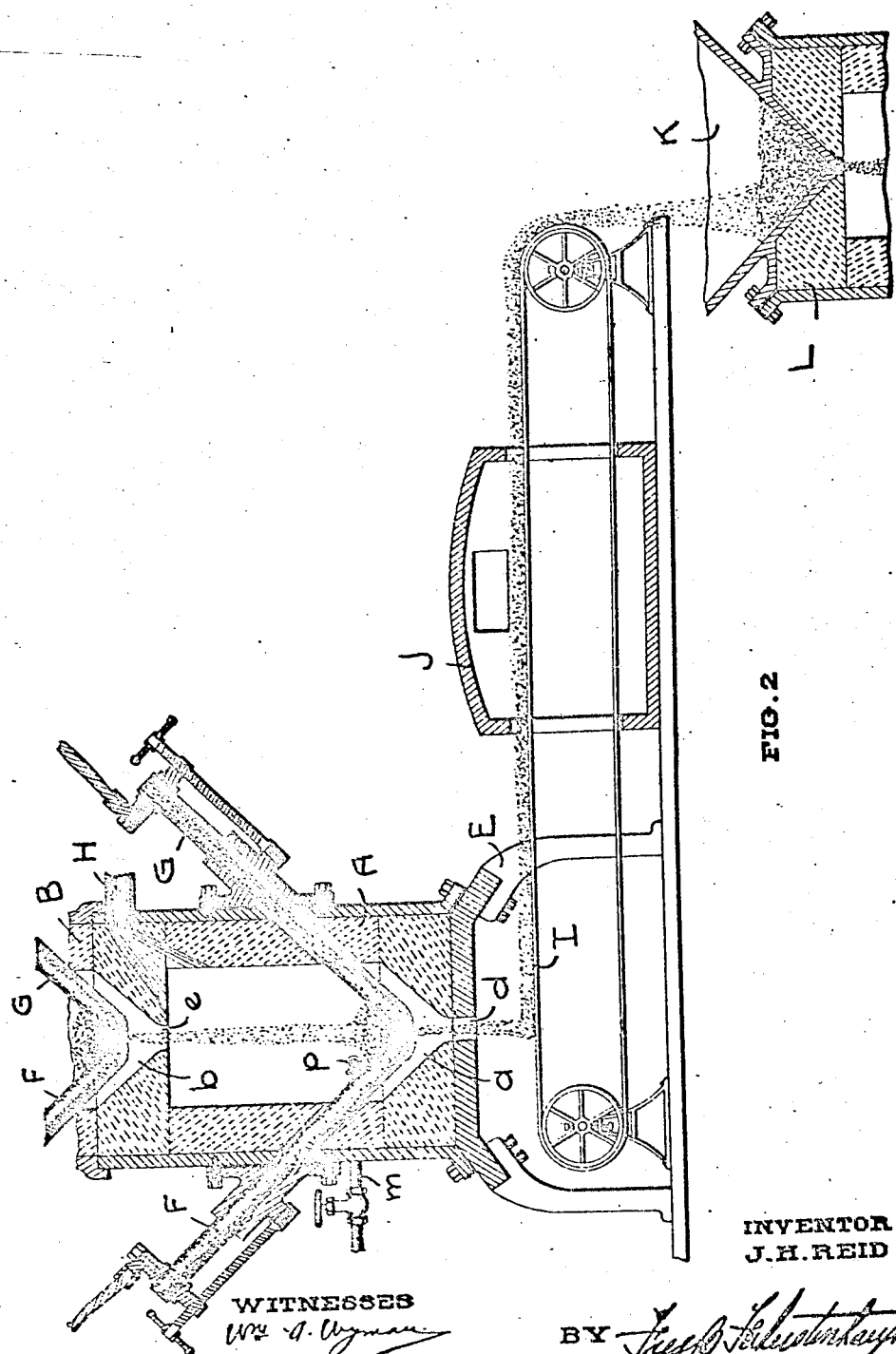

JAMES HENRY REID, OF CORNWALL, ONTARIO, CANADA, ASSIGNOR OF ONE-HALF TO STEPHEN LEMUEL TINGLEY, OF OTTAWA, CANADA.

PROCESS OF TREATING ORE.

No. 895,196.    Specification of Letters Patent.    Patented Aug. 4, 1908.

Application filed April 1, 1907. Serial No. 365,782.

*To all whom it may concern:*

Be it known that I, JAMES HENRY REID, of Cornwall, in the county of Stormont, Province of Ontario, Canada, have invented certain new and useful Improvements in Processes of Treating Ore, of which the following is a specification.

My invention relates to a process for treating ore or like substances for the extraction of the valuable minerals therein and the recovery of the by-products; and the objects of my invention are to provide a simple and efficient process for subjecting complex minerals to the action of heat, chemical re-agents and electricity in one and the same apparatus, the various successive steps being simultaneously carried out and the different constituents separately recovered.

The separation and refining of the metals and other elements in compound minerals, as at present carried out, is an exceedingly tedious, complicated and costly process, and although the utilization of the heat and the influence of an electric current has facilitated the process, considerably, yet the disadvantage still remains that the process is not sufficiently concentrated, and before each metal can be obtained in a separate and pure state, it is necessary to pass the metal through a considerable number of different forms of apparatus, each very ingeniously designed to accomplish one particular process. What is gained, however, in the adaptability of the individual apparatus, is lost by the inexactness and tediousness of the process as a whole, the transfer of the ore from one apparatus to the next, frequently causes such changes in the physical or chemical constitution of the minerals as to place a gap in the continuity of the process, entailing a waste of material or an undesirable electrical or chemical combination. Where accuracy was obtained in this process, time and commercial propriety were lost, and in many minerals it was profitable only to recover the most valuable metals, leaving the remainder as a waste residue.

According to my invention, the extraction is produced by successively submitting the ore in a crude or prepared state to the effects of a number of electric arcs each capable of independent regulation of intensity and quantity, having currents of successively increasing intensity, acting on the ore where necessary with suitable re-agents, while under the action of the electric arc and withdrawing the sublimed or volatile products separately from each arc in succession for further action in refining, condensation, or storing. To accomplish this, I form a chamber about each electric arc, the different chambers discharging into each other and each being provided with well-known instrumentalities for introducing re-agents and withdrawing the volatile products.

The easiest sublimed metal or element in the ore will be freed in the first chamber and the residue gradually dropping into the next chamber will be there acted on by any necessary re-agents and an electric current to produce such a temperature as will free the next amenable metal or element. This process is repeated in the succeeding chambers until finally all the desirable elements are recovered, the number of stages depending on the complexity of the ore and the character of the elements therein.

Where necessary, a suitable flux may be introduced between two successive steps in the process in order to better facilitate the extraction of the elements desired.

An embodiment of the apparatus for carrying out my process is illustrated in the accompanying drawings, in which, Figure 1 is a sectional view of the apparatus. Fig. 2 is a view of a modified form of the invention having means for introducing a flux or otherwise treating the ore between two successive steps in the process.

Referring to the apparatus shown in Fig. 1, it will be observed that it is constructed in three separately formed sections A, B, and C, superimposed on each other and similar in form, each having inclined conical bottoms $a$, $b$, and $c$, with central apertures $d$, $e$ and $f$, through which the ore may pass.

A suitable feeding hopper D is provided at the top of the apparatus and a suitable supporting base E is provided at the bottom thereof.

Each of the treating chambers, or sections A, B and C, are provided with well-known instrumentalities for heating, introducing re-agents and withdrawing the volatile or sublimed products. The heating means illustrated are electrodes F and G which extend through the walls of each chamber and are regulated by suitable means, such as a standard $g$ journaled in bearings $h$ on castings $i$ and operating through straps $j$ secured to the electrodes.

The volatile products are withdrawn by any suitable well-known means through outlet pipes H in each chamber.

The introduction of re-agents in the embodiment illustrated, is effected through nozzles n, o and p, connected to valved conducting pipes k, l and m, adapted to supply the re-agents in a liquid, gaseous, or finely powdered state under pressure, or not, as desired.

For withdrawing the ultimate products after passage through the apparatus, any conveying belt may be provided operating below the aperture in the lowest chamber.

Where it is necessary to introduce a flux, or otherwise treat the ore between two heating operations, the apparatus shown in Fig. 2 will be employed. In this, the conveying belt I passes through the treating chamber J and discharges the ore into the hopper K of a second apparatus similar to the first, in which the process may be further carried on to any desired extent.

In carrying out my improved process, the ore in a crude or prepared state, is fed into the top hopper. Passing through the first chamber, it is subjected to such temperature as will free the easiest sublimed element which it is desired to recover. Where the character of the element requires it, a suitable re-agent may be introduced into the ore through the nozzle n while the ore is being subjected to the action of the electric current.

The residue of the ore, after this element has been extracted, will pass into the second chamber where the temperature will be raised and the treatment made suitable for the extraction of the next amenable element, which will be withdrawn in a volatile state through the outlet pipe H. This process is continued in each successive chamber, the apparatus being generally designed with reference to the particular ore to be treated and having a sufficient number of sections to accomplish the separate recovery of each desired element. In certain cases, before some of the metals can be freed, it is necessary to add a flux to the ore, and this could be accomplished conveniently by the apparatus shown in Fig. 2, in which the flux will be introduced during passage through the treating chamber J.

It will be observed that the process throughout is carried out in one continuous operation in a single apparatus, each element in the ore being recovered separately and being treated for at the exact temperature at which its recovery can be most efficiently made. The temperature of each chamber and the means for introducing re-agents therein are independently controlled for each chamber, enabling the process to be carried out with a great degree of exactness.

It will further be observed that very little of the ore will be in contact with the wall of the chamber, as it passes through in practically a continuous stream and is only retarded at the different points where it is acted on by the electric arc.

What I claim as my invention is:—

1. The herein described process of treating ore, which consists in passing the ore in a continuous stream through a number of electric arcs producing different temperatures, independently and separately withdrawing the volatile products freed at each arc and independently treating the different volatile products after withdrawal.

2. The herein described process of treating ore, which consists in passing the ore in a continuous stream through a number of electric arcs, introducing reagents while under the action of the said arcs, independently and withdrawing separately, the volatile products freed by each arc and independently treating the different volatile products after withdrawal.

3. The herein described process of treating ore, which consists in passing the ore in a continuous stream through a number of different and simultaneously operated electric arcs, introducing reagents into the ore, while under the action of certain of the arcs, independently and withdrawing separately the volatile products sublimed by each arc and independently treating the different volatile products after withdrawal.

4. The herein described process of treating ore, which consists in electrically creating different zones of temperature about a falling stream of the ore, independently and separately withdrawing the volatile products sublimed in each zone, as and for the purpose specified and independently treating the different volatile products after withdrawal.

Signed at Ottawa, in the Province of Ontario, this 20th day of March, 1907.

JAMES HENRY REID.

Witnesses:
  RUSSEL S. SMART,
  WM. A. WYMAN.